No. 872,192. PATENTED NOV. 26, 1907.
M. A. OLSON.
WINDOW PANE FASTENING.
APPLICATION FILED JAN. 9, 1907.

Witnesses
J. C. Simpson
Arthur W. Crossley

Inventor
Martin A. Olson
By Chandler & Chandler
Attorneys

UNITED STATES PATENT OFFICE.

MARTIN A. OLSON, OF BRAINERD, MINNESOTA.

WINDOW-PANE FASTENING.

No. 872,192.      Specification of Letters Patent.      Patented Nov. 26, 1907.

Application filed January 9, 1907. Serial No. 351,515.

*To all whom it may concern:*

Be it known that I, MARTIN A. OLSON, a citizen of the United States, residing at Brainerd, in the county of Crow Wing, State of Minnesota, have invented certain new and useful Improvements in Window-Pane Fastenings; and I do hereby declare the following to be a full, clear, and exact description of the invention, such as will enable others skilled in the art to which it appertains to make and use the same.

This invention relates to fastenings for window panes in sashes, of the kind to take the place of putty which has heretofore been commonly employed.

It is the object of the invention to provide a fastening device composed of strips of material of suitable lengths and triangular in cross section so that one face of the strip may rest against the outer margin of a pane of glass, the other against the side of the window-sash, while the third will face outwardly, said strip being composed of rubber or similar yielding material having inset longitudinally and centrally in its outer face a strip of metal, the outer face of which strip may be flush with the outer face of the fastening strip and said strip being provided at intervals along its length with holes for the reception of fastening screws.

The nature of the invention is fully disclosed in the means portrayed in the annexed drawings, forming a part of this specification, in view of which it will first be described with reference to its structural character and manner of use, and then be pointed out in the subjoined claims.

Figure 1:
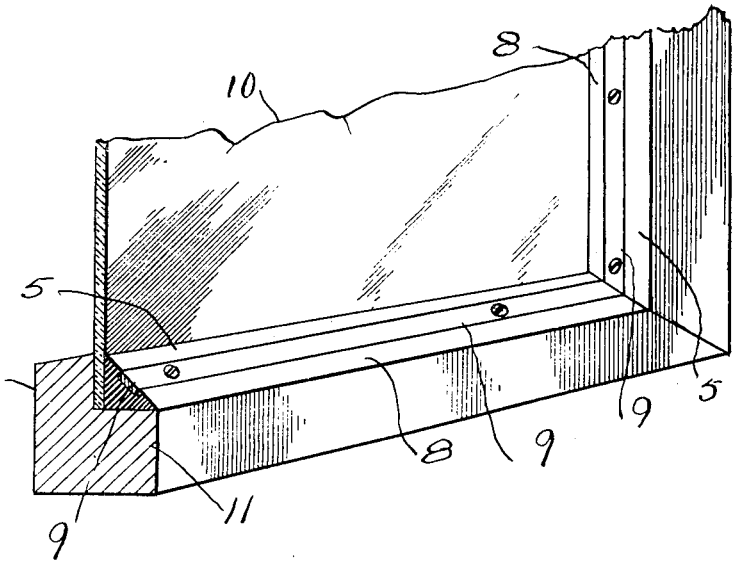
Figure 2:
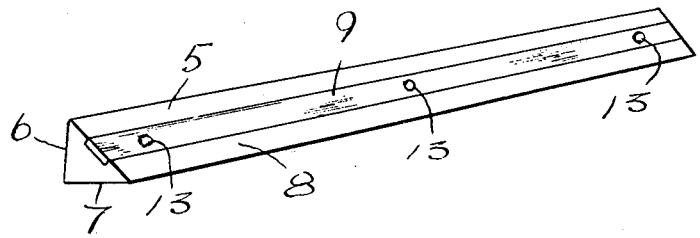
Figure 3:
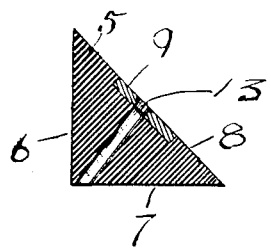

Of the said drawings—Figure 1 is a perspective view of a portion of a window sash, a window pane and my improved strip in place on the sash. Fig. 2 is a perspective view of a short length of the fastening means detached, illustrating its structural features. Fig. 3 is a cross section of the improved strip.

Similar numerals of reference designate similar parts or features, as the case may be, wherever they occur.

In the drawings 5 designates a strip of rubber of suitable dimensions for the purpose for which it is to be used and of any desired length, which strip is triangular in form in cross section so that one face 6 may rest against the margin of a window pane 10, another face, 7, resting on the ledge or offset part 11 of the sash 12, and a third face 8 being outwardly exposed.

9 designates a strip of metal inset in a groove formed centrally and longitudinally of the strip so that the outer face of the strip of metal may be flush with the outer face 8 of the rubber strip 5. Holes 13 are formed through the metallic strip 9 for the reception of fastening screws for securing the strip to the sash. The said holes may be extended through the rubber portion 5 of the device, if desired. The metallic strip 9 is provided for the purpose of giving rigidity to the rubber body and it may be composed of galvanized metal so as to protect it against corrosion, and prevent it in some degree at least from acting to disintegrate the rubber. The direction of the holes 13 will be such as to allow the fastening screws to enter the sash at the desired point. The strip 9 will not be so thick as to make it difficult to cut the complete fastening strip into suitable lengths for use.

What is claimed is—

A device of the type set forth, comprising a strip of rubber, having the cross sectional shape of a right angle triangle, and having its outer hypotenuse face formed with a longitudinal recess, said strip being formed at intervals with openings extending from said outer face to a point in the lower face of the same, and a strip of metal set conformably into said longitudinal recess and being flush with said outer face, said metallic strip being formed with openings registering with said first named openings for the reception of fastening means.

In testimony whereof, I affix my signature, in presence of two witnesses.

MARTIN A. OLSON.

Witnesses:
     SEVERT OLSON,
     W. V. SMALL.